United States Patent [19]

Harrington

[11] Patent Number: 4,897,939
[45] Date of Patent: Feb. 6, 1990

[54] FOOTWEAR REINFORCEMENT
[75] Inventor: Robert Harrington, Bootle, England
[73] Assignee: Dunlop Limited a British Company, United Kingdom
[21] Appl. No.: 254,243
[22] Filed: Oct. 6, 1988
[30] Foreign Application Priority Data
  Oct. 13, 1987 [GB] United Kingdom ................. 8723962
[51] Int. Cl.⁴ ............................................. A43B 23/00
[52] U.S. Cl. ..................................... 36/108; 36/76 R; 36/107; 36/113
[58] Field of Search ............. 36/72 A, 72 R, 73, 75 R, 36/76 C, 76 R, 91, 107, 108, 113, 30 A, 30 R

[56] References Cited

U.S. PATENT DOCUMENTS

| 1,634,516 | 7/1927 | Rogers | 36/76 R |
| 2,173,189 | 9/1939 | Whelton | 36/76 C |
| 2,199,713 | 5/1940 | Perugia | 36/113 |
| 4,133,117 | 1/1979 | Bradley | 36/76 C |
| 4,231,169 | 11/1980 | Toyama | 36/76 C |
| 4,272,897 | 6/1981 | Ponce | 36/76 R |
| 4,366,629 | 1/1983 | Scherz | 36/108 |
| 4,439,937 | 4/1984 | Daswick | 36/108 |
| 4,463,505 | 8/1984 | Duclos | 36/30 R |
| 4,729,179 | 3/1988 | Quist | 36/76 C |

FOREIGN PATENT DOCUMENTS

| 2152465 | 4/1973 | Fed. Rep. of Germany | 36/108 |
| 2655384 | 6/1977 | Fed. Rep. of Germany | 36/107 |
| 2060350 | 5/1981 | United Kingdom | 36/107 |

Primary Examiner—Werner H. Schroeder
Assistant Examiner—Diana L. Biefeld
Attorney, Agent, or Firm—Stevens, Davis, Miller & Mosher

[57] ABSTRACT

An article of footwear comprises an upper, a flexible metal midsole and an outsole. Between the flexible metal midsole and the outsole is located an internal arch-reinforcement member or "digging-plate".

The "digging-plate" may be made of a rigid plastics material, suitably a fibre-reinforced plastics material.

7 Claims, 1 Drawing Sheet

U.S. Patent  Feb. 6, 1990  4,897,939
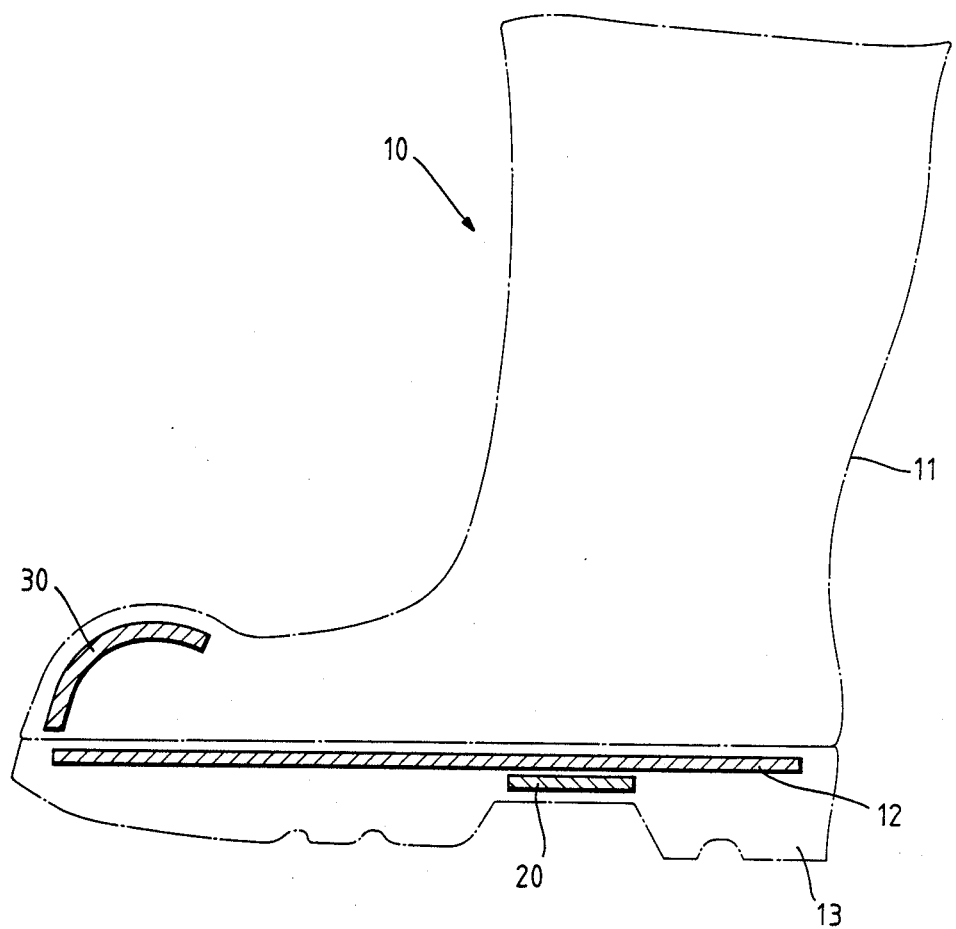

FOOTWEAR REINFORCEMENT

This invention relates to articles of footwear having an internal arch reinforcement and to a method for their manufacture. Although the present invention will be described herein with particular reference to a reinforced moulded boot, it is not to be construed as being limited thereto.

When boots are worn for use in digging operations, the spade or other implement tends to cut or abrade the arch region of the outsole of the boot. Outsoles of rubber are cut-resistant to some extent, but outsoles of pvc (the preferred material for bulk manufacture of boots) are relatively quickly damaged by repeated digging operations.

It is known to provide such boots with an external, "tie-on" metal plate to reinforce the arch region of the outsole. Such plates, known as "digging plates" are expensive, cumbersome and tend to be inefficient.

It is also known, in the case of boots with hand-made rubber outsoles, to incorporate an arch reinforcement member on the outside of the boot. However, in the case of pvc boots, such an external reinforcement, being of a harder material than that of the outsole, would tend to "break away" on flexing of the sole when the boot is in use.

We have found that reinforcement of the arch region of the outsole can be achieved, according to the present invention, by providing an internal "digging-plate" of a rigid plastics material.

Accordingly, the present invention provides an article of footwear comprising an upper, a flexible metal midsole and an outsole, in which an arch reinforcement member is located between the midsole and the outsole.

The present invention further provides a method for the manufacture of an article of footwear of the type described in the immediately-preceding paragraph, the method comprising the following stages:
  (i) attaching the arch reinforcement member to the midsole;
  (ii) placing the midsole assembly in an injection mould and closing the mould by means of a sole closure plate;
  (iii) injecting the material to form the upper and to secure the midsole assembly thereto;
  (iv) replacing the sole closure plate with an outsole moulding plate and injecting the material to form the outsole.

The arch reinforcement member suitably consists of a plate of a rigid plastics material, preferably a fibre-reinforced plastics material. Examples of such materials include fibre-reinforced polycarbonates and polypropylenes. The particularly preferred reinforcing fibres are glass fibres.

In the moulding process according to the present invention, the sole closure plate may be shaped so as to accommodate the arch reinforcement member.

To avoid movement of the arch reinforcement member during the moulding process, the member is attached to the midsole prior to placing the midsole assembly in the mould. This may be achieved by means of a suitable adhesive.

In the finished boot, the arch reinforcement member can constitute part of the thickness of the outsole.

Alternatively, the outsole can be modified so as to have its normal thickness in addition to the thickness of the arch reinforcement, for example, to comply with British Standard Specifications 1870 part 3 and 6159 part 1 (which relate to safety footwear).

The preferred material for the arch reinforcement member (a glass fibre-reinforced polycarbonate) meets the nail penetration test requirements specified in British Standard Specification 1870 Part 3.

If required, footwear according to the present invention can include a toe reinforcement, known per se.

The present invention will be illustrated, merely by way of example, in the following description and with reference to the accompanying drawing.

In the drawing, the single FIGURE is a schematic longitudinal section through a footwear article including an arch-reinforcement member according to the present invention.

A boot (indicated generally at 10) consists of an upper 11, a flexible metal midsole member 12 and an outsole member 13. An arch-reinforcement member 20 is secured between members 12 and 13. The boot 10 is additionally provided with an internal toe-reinforcement member 30.

I claim:

1. In a footwear article suitable for heavy duty outdoor use consisting of an upper attached to an outsole member and a flexible metal midsole member secured between said upper and said outsole member, the improvement which comprises securing an additional arch-reinforcement member within the sole between said flexible metal midsole member and said outsole member so as to strengthen the sole in the area contacted by a shovel when the wearer is using a shovel for digging.

2. The article of claim 1, wherein said arch-reinforcement member is made of a rigid plastics material.

3. The article of claim 2, wherein said arch-reinforcement member is made of a rigid, fibre-reinforced plastics material.

4. The article of claim 2, wherein said rigid plastics material is a material selected from the group consisting of polycarbonates and polypropylenes.

5. The article of claim 3, wherein said fibres are glass fibres.

6. The article of claim 1, wherein said outsole member is shaped so as to accommodate said arch-reinforcement member.

7. The article of claim 1, wherein said arch-reinforcement member is secured to said flexible metal member by means of an adhesive.

* * * * *